United States Patent [19]

Daly

[11] Patent Number: 4,483,680

[45] Date of Patent: Nov. 20, 1984

[54] GENEALOGICAL INFORMATION RECORDING AND ARRANGEMENT METHOD AND APPARATUS

[76] Inventor: Louise A. Daly, 944 NW. Innis Arden Way, Seattle, Wash. 98177

[21] Appl. No.: 560,737

[22] Filed: Dec. 12, 1983

[51] Int. Cl.³ .............................................. G09B 29/00
[52] U.S. Cl. .................................... 434/154; 283/1 A; 283/902
[58] Field of Search ................ 434/154; 283/1 A, 902

[56] References Cited

U.S. PATENT DOCUMENTS

| 527,261 | 10/1894 | Bailey | 434/154 X |
| 699,799 | 5/1902 | Guild | 434/154 X |
| 1,098,833 | 6/1914 | Olinger | 434/154 X |
| 4,201,386 | 5/1980 | Seale et al. | 434/154 X |

Primary Examiner—William H. Grieb
Attorney, Agent, or Firm—Seed and Berry

[57] ABSTRACT

A method and apparatus for recording and displaying genelogical or pedigree information on humans or animals are provided, wherein data on individuals is recorded on a plurality of interconnectable discrete patterns imprinted on transparent, self-adhesive material, the appropriate pattern being selected on the basis of the individual's gender, marital status, and status as a direct or collateral descendant, and then completed patterns are arranged on a display means to illustrate familial or blood-line relationships.

8 Claims, 9 Drawing Figures

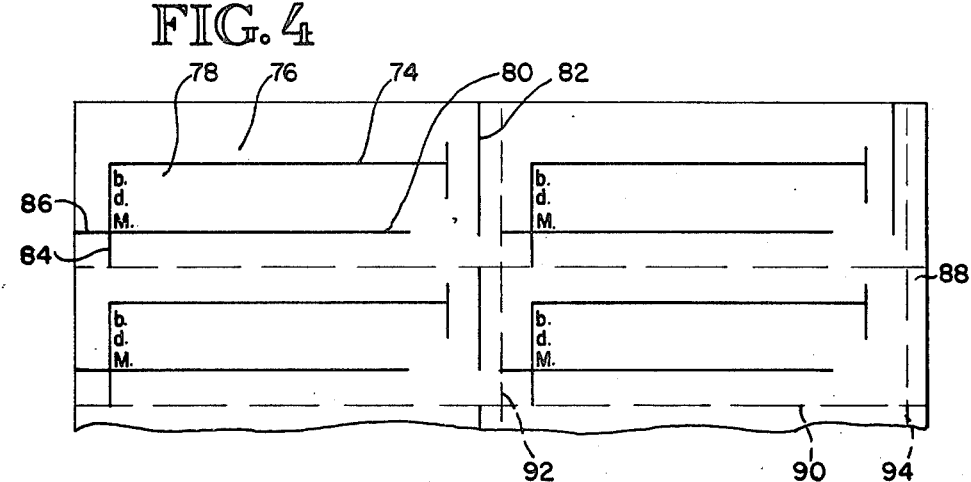
FIG. 4
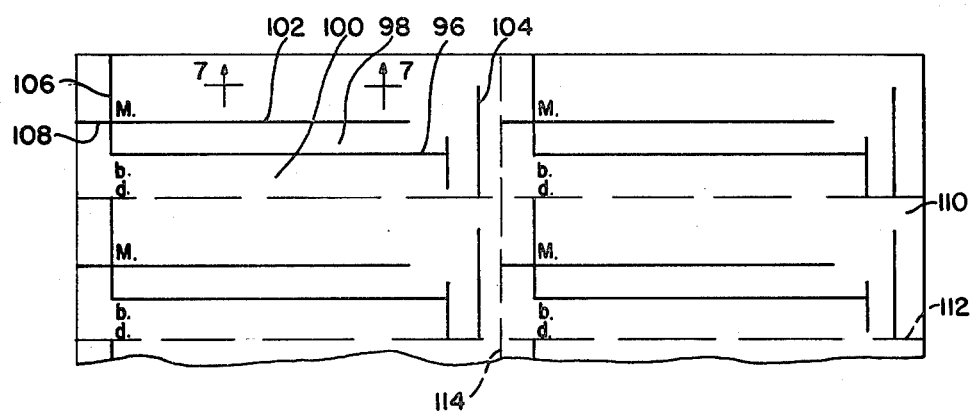
FIG. 5
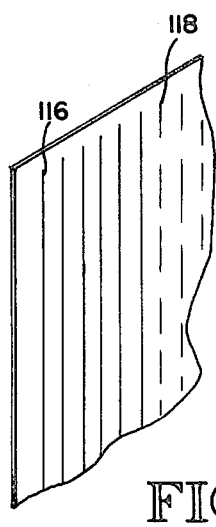
FIG. 6
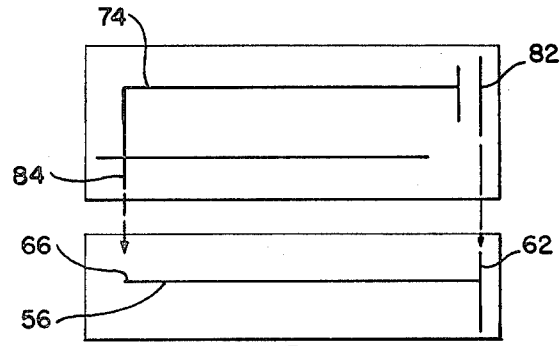
FIG. 7
FIG. 4A

GENEALOGICAL INFORMATION RECORDING AND ARRANGEMENT METHOD AND APPARATUS

DESCRIPTION

1. Technical Field

This invention pertains to systems for gathering, recording, and portraying genealogical and pedigree information.

2. Background Art

A typical practice of genealogists is to gather information on family history, such as names, birth dates, death dates, marriages, etc., and record such information on a standard lineal branching chart, commonly known as a "pedigree chart." A similar chart is used by animal breeders to record pedigree information on horses, dogs, etc. Such a chart imposes a number of inherent limitations. First, it provides for the recording of only lineal (or direct) descendants or ancestors, that is, father and mother, grandparents, great-grandparents, etc. It does not provide for the convenient recording of collateral relations, such as brothers and sisters, cousins, and aunts and uncles, or of their marriage relations, or of second marriages of lineal descendants, such as the second wife of a father. Second, the standard chart does not provide an equal amount of space for recording information as to each generation. The confines of a recangular sheet of paper or other material dictate that the branches representing remote ancestors be more closely spaced together. Third, the standard chart makes no provision for additional family members within a generation (beyond the lineal or direct line). Finally, the conventional pedigree chart does not separate the recording of basic information on individuals from the positioning of the individual in terms of family relationships.

DISCLOSURE OF INVENTION

It is an object of this invention to display a complete array of genealogical and pedigree data, including direct and collateral lines, their marriages, descendants, and ancestors; multiple marriages; all descendants of a common ancestor, and all ancestors of an individual.

It is a further object of this invention to portray genealogical and pedigree information in records of equal size for each generation.

It is a further object of this invention to provide a display of genealogical and pedigree information that allows indefinite expansion in terms of generations or members within a generation.

It is a further object of this invention to separate the steps of recording information on individuals and of displaying the relationships among individuals.

These objects are obtained by providing a method and apparatus for first recording the name and available vital data for each individual on one of a plurality of discrete interconnectable patterns imprinted on transparent, self-adhesive material, the appropriate pattern being selected on the basis of the individual's gender, marital history, and status as a direct or collateral descendant, and then arranging the patterns so as to illustrate the appropriate familial genealogical relationships.

BRIEF DESCRIPTION OF THE DRAWINGS

FIG. 4 shows the third of four patterns. This pattern is for recording either male mates of collateral relations or additional mates of male descendants.

FIG. 4A illustrates the overlapping of the third pattern and the second pattern.

FIG. 5 shows the fourth of four patterns. This pattern is for recording either female mates of collateral relations or additional mates of female descendants.

FIG. 6 shows a pattern of imprinted connecting lines.

FIG. 7 shows a cross-sectional view of the pattern of FIG. 5.

BEST MODE FOR CARRYING OUT THE INVENTION

Figure 1:
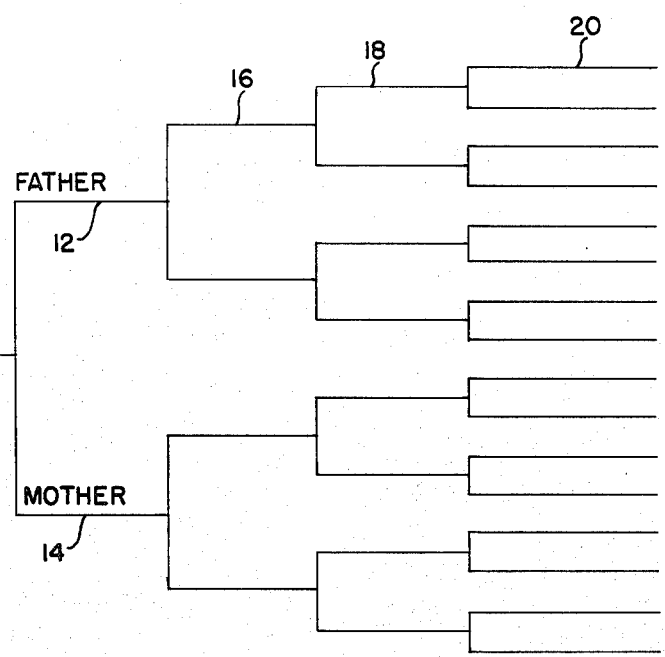
FIG. 1 shows a conventional lineal branching chart, commonly known as a "pedigree chart."

FIG. 1 shows a prior art lineal branching chart. Conventional practice is to record descendants toward the left and ancestors toward the right of any chart and to place male relations on the top and female relations on the bottom of any branch representing a parental relationship. Information on a selected individual, such as name, birth date, and death date, is placed on a trunk 10. Information on the father and mother of that person is recorded on branches 12 and 14. The chart continues back through generation 16 for grandparents, generation 18 for great-grandparents, and generation 20 for great-great-grandparents. The information on distant generations such as 18 and 20 must be compressed into smaller spaces in order to maintain the proportions of the chart. The chart provides no clearly defined space for recording collateral relations, such as brothers, aunts and uncles, etc., or marriage relations other than those between direct descendants or ancestors.

Figure 2:
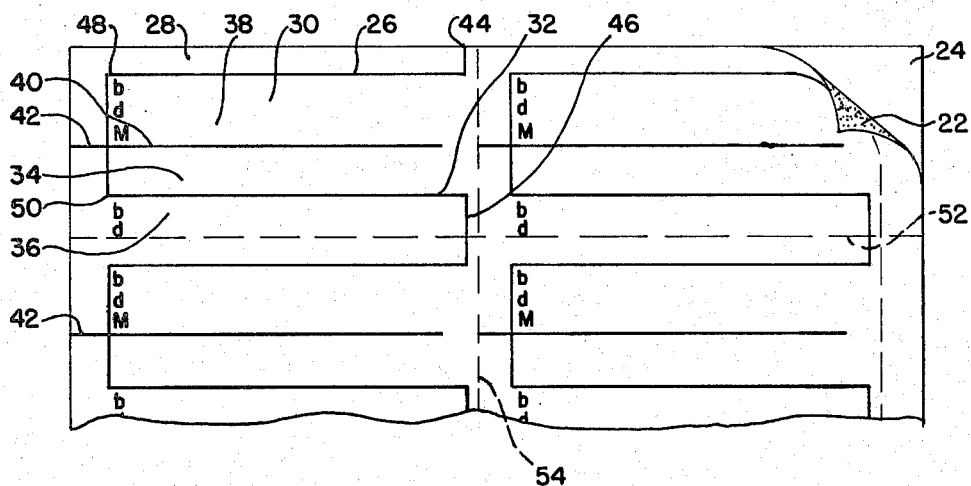
FIG. 2 shows the first of four patterns imprinted on transparent material. This pattern is for recording pairs of direct descendants or ancestors.

FIG. 2 illustrates the first of four recording patterns for carrying out one embodiment of this invention. This embodiment is for the recording of genealogical information on humans. The first pattern is for the recording of direct descendants or ancestors, that is, parents, grandparents, etc. This and all of the patterns are imprinted on transparent one-mil matte-surface polyester film with a pressure-sensitive back 22. The film is mounted on a stiff opaque backing 24. The matte-surface of the film is suitable for inscription by either a marker or typewriter. The pattern may be peeled off the back. The name of the male member of a parental pair may be recorded above line 26 in space 28. Birth and death dates (if known) may be recorded below line 26 in space 30. The name of the female member of the parental pair may be recorded above line 32 in space 34. Birth and death dates may be recorded below line 32 in space 36. A marriage date can be recorded in space 38 above line 40. The pattern provides space for recording additional information on the individual, such as baptism, divorce, burial place, immigration data, etc. Each individual may also be identified by a alphanumeric code. Line 42 is for tracing descendants of the parental pair. Line 44 is for tracing siblings and ancestors of the individual recorded in space 28. Line 46 performs a comparable function for the individual recorded in space 34. As will be seen in FIGS. 4 and 10, an additional spouse of the male member of the parental pair may be traced by overlapping a pattern which connects to the left-hand end 48 of line 26 and the upper end of 44. Similarly, as will be seen in FIG. 5, an additional spouse of the female member of the parental pair may be traced by overlapping a pattern which connects to the left-hand end 50 of the line 32 and the lower end of 46.

The pattern is most conveniently reproduced and distributed in large strips with multiple reproductions of the pattern. Horizontal line 52 and vertical line 54 guide the user of the invention in severing a discrete pattern. In this embodiment, each reproduction of the pattern is $1\frac{5}{8}''$ by 4'' in size.

Figure 3:
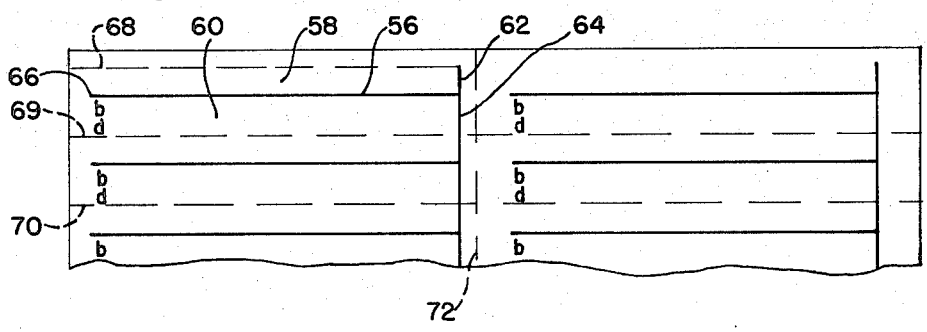
FIG. 3 shows an embodiment of the second of four patterns. This pattern is for recording collateral relations.

FIG. 3 illustrates an embodiment of the second of four recording patterns for carrying out the invention. This pattern is for recording collateral relations, i.e., brothers and sisters, aunts and uncles, etc. The pattern is imprinted in the same fashion as the pattern of FIG. 2. The name of the relation is recorded above the line 56 in space 58. Birth and death dates (if known) may be recorded below the line 56 in space 60. Lines 62 and 64 are for tracing ancestors and siblings of the collateral relation. As will be seen in FIGS. 4 and 5, a spouse of such a collateral relation can be traced by overlapping from above or below a pattern which connects to the left hand end 66 of line 56 and the end of 62 or 64. Horizontal lines 68, 69, and 70 and vertical line 72 guide the user of the invention in severing discrete patterns. In this embodiment, each reproduction of the pattern is 11/16'' by 4'' in size.

FIG. 4 illustrates an embodiment of the third of four recording patterns for carrying out the invention. This pattern is for the recording of either a male spouse of a collateral relation, who is recorded on the pattern illustrated in FIG. 3, or an additional spouse of direct male descendants, who are recorded on the pattern illustrated in FIG. 2. This pattern would be used, for example, to record information on a stepmother or a brother-in-law. The name of the spouse may be recorded above line 74 in space 76. Birth and death dates may be recorded below line 74 in space 78. The marriage date is recorded above line 80. Line 82 is for tracing sibling relationships of the person to whom the spouse is married. In the case of a male spouse of a female collateral, the marriage relation is traced by overlapping patterns so as to connect line 84 on the pattern of FIG. 4 to line 56 at end 66 on the pattern of FIG. 3 and the bottom end of line 82 on the pattern of FIG. 4 to the top end of line 62 on the pattern of FIG. 3. (This overlapping is further illustrated in FIG. 4A.) In the case of an additional female spouse of a male direct descendant or ancestor, the marriage relation is traced by overlapping the pattern so as to connect line 84 on the pattern of FIG. 4 to line 26 at end 48 on the pattern of FIG. 2 and the bottom of line 82 on the pattern of FIG. 4 to the top of line 44 on the pattern of FIG. 2. In each case, descendants of the marriage can be traced through line 86. Horizontal lines 88 and 90 and vertical lines 92 and 94 guide the user of the invention in severing a discrete pattern. In this embodiment, each reproduction of the pattern is 1 5/16'' by 4'' in size.

Figure 8:
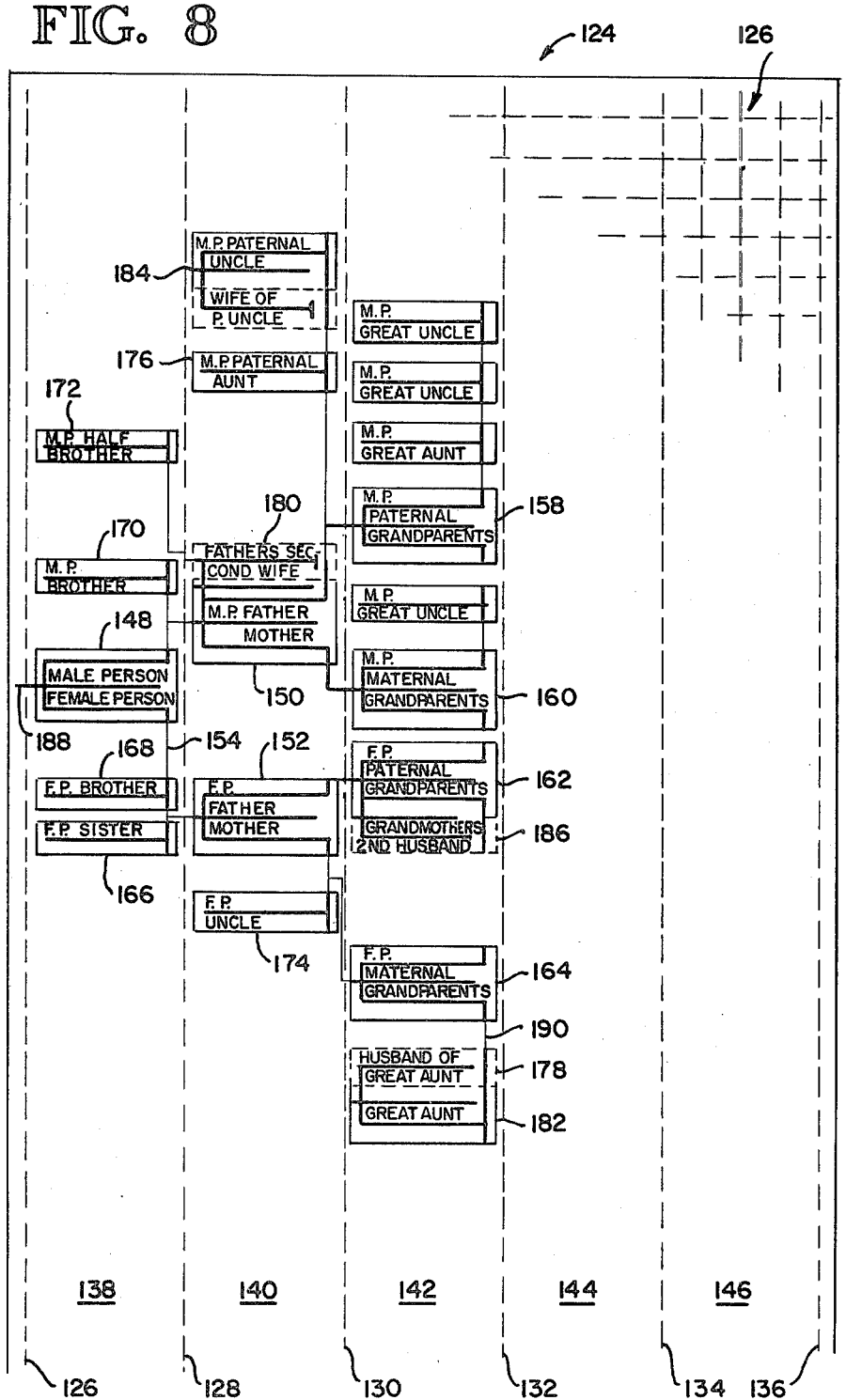
FIG. 8 shows the patterns of FIGS. 2, 3, 4, and 5 with genealogical information recorded thereon, and arranged on a mounting chart with connecting lines from the patterns of FIG. 7 so as to display graphically the genealogical relations of a family group.

FIG. 4A illustrates the overlapping of the recording pattern of FIG. 3 with the recording pattern of FIG. 4. Information on a female collateral, such as an aunt, is entered above and below line 56 on the pattern of FIG. 3. Information on the mate of such a collateral relation, i.e., the aunt's husband, is entered above and below line 74 on the pattern of FIG. 4. When the completed forms are displayed on a mounting chart, as illustrated in FIG. 8, the pattern of the aunt is first placed on the chart. The form of the aunt's husband is then overlapped so that line 84 connects with end 66 of line 56. This shows the marriage relationship. Simultaneously, line 82 connects with line 62 to show siblings and ancestors of the aunt. The transparent nature of the forms allows information, such as that above line 56, to be visible despite the overlapping of the forms.

FIG. 5 illustrates an embodiment of the fourth of four recording patterns for carrying out the invention. This pattern is for recording either a female spouse of a male collateral relation, or additional spouses of direct female descendants or ancestors. The pattern is a vertical inversion of the pattern of FIG. 4. The name of the spouse may be recorded above line 96 in space 98. Birth and death dates may be recorded below line 96 in space 100. The marriage date is recorded above line 102. Line 104 is for tracing sibling relationships of the person to whom the spouse is married. In the case of a female spouse of a collateral relation, the marriage relation is traced by overlapping patterns so as to connect line 106 on the pattern of FIG. 5 to line 56 at end 66 on the pattern of FIG. 3 and the top of line 104 in the pattern of FIG. 5 to the bottom of line 64 in the pattern of FIG. 3. In the case of an additional male spouse of a direct descendant or ancestor, the marriage relation is traced by overlapping the pattern so as to connect line 106 on the pattern of FIG. 5 to line 32 at end 50 of the pattern of FIG. 2 and the top of line 104 in FIG. 5 to the bottom of line 46 in FIG. 2. Descendants of the marriage are traced through line 108. Horizontal lines 110 and 112 and vertical line 114 guide the user of the invention in severing a discrete pattern. In this embodiment, each reproduction of the pattern is 1 5/16'' by 4'' in size.

FIG. 6 illustrates an embodiment of a pattern of lines imprinted on the same polyester film as the four recording patterns. The lines can be severed and used to illustrate collateral ancestor and descendant relationships as illustrated in FIG. 8. Solid lines, such as line 116, may be conventionally used to illustrate known relationships, while dotted lines, such as line 118, may be conventionally used to illustrate uncertain or illegitimate relationships. The use of imprinted connected lines provides a convenient method of making a clear display. However, such lines can be added manually or by other means.

FIG. 7 is a cross-sectional view of the imprinted patterns, such as FIG. 5. A sheet of transparent polyester film 120 is mounted on a backing 122. A pattern is imprinted on the film 120. The film may be peeled off of the backing by upward manual pressure at an edge of the pattern.

FIG. 8 illustrates a display of genealogical relationships using the recording patterns of FIGS. 2–5 and the imprinted lines of FIG. 6. A mounting chart 124 contains light grid lines 126 to guide the placement of patterns. The chart contains heavy vertical lines 127, 128, 130, 132, 134, and 136 which separate the area into five vertical columns 138, 140, 142, 144 and 146. All lines should be of a color, such as a light blue, that will not reproduce on a standard photocopy machine. A chart 24×36 inches is desirable as it is large enough to display a significant number of patterns for a typical family history but may be reproduced as a diazo print commonly used by architects and engineers, or may be reproduced in a smaller format by use of a reduction copier. The columns should be slightly wider than the recording patterns of FIGS. 2-5. Thus if the patterns are 4" in width, the column should be approximately 4½" in width.

To construct the display of FIG. 8, appropriate genealogical information is entered on the patterns of FIGS. 2-5. The correct pattern can always be chosen on the basis of three facts concerning any individual: (1) gender, (2) marital history, and (3) status as a direct or collateral relation. After the entry of information, the patterns are severed from the multiple pattern strips. The severed patterns are arranged on the chart to illustrate the appropriate genealogical relationships. As noted, it is conventional practice to place the younger generations to the left and the older to the right. A hypothetical family history is arranged in FIG. 8. Pattern 148 records a male and female marital pair and is placed in column 138. Patterns 150 and 152 record parents of the pair and are placed in generational column 140. Connecting lines from the pattern of FIG. 6 are used to show lines of descent such as line 154. Patterns 158, 160, 162 and 164 record grandparents in a similar fashion. The collateral relations recorded on the pattern of FIG. 3 are added. Thus, for example, patterns 166, 168, 170 and 172 show siblings of the male and female persons of pattern 148. Pattern 174 shows an uncle. Pattern 176 shows an aunt. Right-hand connecting lines such as line 174 and line 190 uniformly signify the existence of a sibling relationship.

Male spouses of collateral relations are recorded on the pattern of FIG. 4. Thus, pattern 178 shows the husband of a great-aunt. As illustrated in FIG. 4A, pattern 178 is so positioned as to overlap and connect with pattern 182, which records the great-aunt. Additional female spouses of direct descendants are also recorded on the pattern of FIG. 4. Thus pattern 180 shows the second wife of the father of the male person, which similarly overlaps the pattern of said father.

Female spouses of collateral relations are recorded on the pattern of FIG. 5. Thus pattern 184 shows the wife of a paternal uncle. Additional male spouses of direct descendants are also recorded on the pattern of FIG. 5. Thus pattern 186 shows the second husband of a paternal grandmother.

Once patterns are arranged on the mounting chart 124, the polyester film of the various patterns is removed and the patterns are impressed on the chart. The transparent nature of the patterns allows imprinted information to be seen in areas of overlap. The adhesive quality of the film is such as will allow a limited number of removals and reimpressions on the chart should a change in arrangement become necessary. Patterns can be added to the mounted chart as further genealogical information becomes available. The display on the mounting chart is expandable in all directions to show additional relationships or generations. For example, a second chart similar to the mounting chart 124 can be relationally connected to the descendant line 188. A third chart can be relationally connected to the sibling line 190.

Once a genealogical chart has been constructed, it may be reproduced by a number of conventional methods. A diazo print machine may be used to reproduce a full-size copy. Alternatively, a reduction copier may be used. The reduced copy provides a sharp, clear print and can be further reproduced on conventional office copying machines. In each case, the copy will include only the imprinted and recorded information. Guide lines, such as the blue guide lines 126 and the vertical lines 127, 128, 130, 132, 134 and 136 will not reproduce.

The above description illustrates the application of the invention to genealogical information on humans. However, the invention can easily be applied to pedigree information on animals such as horses and dogs.

While a preferred embodiment of the invention has been illustrated and described, variations will be apparent to one of ordinary skill in the art. Accordingly, the invention is not to be limited to the specific embodiment illustrated in the drawing.

I claim:

1. A method of recording and displaying genealogical and pedigree data comprising recording the name and vital statistics of individual members of a family on a discrete pattern imprinted on transparent material, the pattern selected from the group consisting of:

a first pattern for recording parental pairs of direct descendants and ancestors, a second pattern for recording individual collateral relations, a third pattern for recording individual mates of the group consisting of male mates of collateral line female relations and additional mates of direct male descendants and ancestors, the pattern so configured as to overlap relationally with said first and second patterns, and a fourth pattern for recording individual mates of the group consisting of female mates of collateral line male relations and additional mates of direct female descendants and ancestors, the pattern so configured as to overlap relationally with said first and second patterns; and placing said patterns in interconnecting lineal relationships so as to display the genealogical and pedigree relations of said family.

2. The method of claim wherein said transparent material comprises matte-surface polyester film with pressure-sensitive backing laminated to a heavy substrate.

3. A kit for recording and displaying genealogical and pedigree data, comprising:

at least one first pattern for recording parental pairs of direct descendants and ancestors, at least one second pattern for recording individual collateral relations;

at least one third pattern for recording individual mates of the group consisting of male mates of collateral line female relations and additional mates of direct male descendants and ancestors, the patterns so configured as to overlap relationally with said first and second patterns;

at least one fourth pattern for recording individual mates of the group consisting of female mates of collateral line male relations and additional mates of direct female descendants and ancestors, the patterns so configured as to overlap relationally with said first and second patterns; and ruled display means for arranging patterns in interconnecting lineal relationships so as to display genealogical relations.

4. The kit of claim 3 wherein said patterns are imprinted on transparent matte-surface polyester film with pressure-sensitive backing laminated to a heavy substrate.

5. A genealogical and pedigree data recording pattern imprinted on transparent material, the pattern selected from the group consisting of:
- a first pattern for recording parental pairs of direct descendants and ancestors,
- a second pattern for recording individual collateral relations,
- a third pattern for recording individual mates of the group consisting of male mates of collateral line female relations and additional mates of direct male descendants and ancestors, the pattern so configured as to overlap relationally with said first and second patterns, and
- a fourth pattern for recording individual mates of the group consisting of female mates of collateral line male relations and additional mates of direct female descendants and ancestors, the pattern so configured as to overlap relationally with said first and second patterns.

6. The pattern of claim 5 wherein said transparent material comprises matte-surface polyester film with pressure-sensitive backing laminated to a heavy substrate.

7. A method of recording and displaying genealogical and pedigree data comprising:
- the recording of data on individuals on reproductions of a plurality of discrete imprinted transparent patterns consisting of a first pattern for recording direct descendants and ancestors,
- a second pattern for recording collateral relations, and one or more additonal patterns for recording mate relations of collateral relations and additional mate relations of direct descendants and ancestors, said additional patterns being so configured as to connect relationally with said first and second patterns, and the arranging of said patterns with recorded data so as to display genealogical and pedigree relations.

8. An apparatus for recording and displaying genealogical and pedigree data comprising:
- a plurality of transparent information carriers, each carrier having relational lines terminating at different locations on said carrier, and
- a display member for holding said carriers, with various of said carriers having their respective relational lines aligned with the relational lines of other carriers.

* * * * *